United States Patent
Ringsquandl et al.

(10) Patent No.: US 12,541,673 B2
(45) Date of Patent: Feb. 3, 2026

(54) METHOD AND SYSTEM FOR AUTOMATED CORRECTION AND/OR COMPLETION OF A DATABASE

(71) Applicant: Siemens Aktiengesellschaft, Munich (DE)

(72) Inventors: Martin Ringsquandl, Raubling (DE); Mitchell Joblin, Surrey (CA); Aneta Koleva, Munich (DE); Georgia Olympia Brikis, Plainsboro, NJ (US); Rakebul Hasan, Landshut (DE); Marcel Hildebrandt, Munich (DE); Markus Zechel, Traunstein (DE)

(73) Assignee: Siemens Aktiengesellschaft, Munich (DE)

( * ) Notice: Subject to any disclaimer, the term of this patent is extended or adjusted under 35 U.S.C. 154(b) by 45 days.

(21) Appl. No.: 18/681,129

(22) PCT Filed: Aug. 9, 2022

(86) PCT No.: PCT/EP2022/072331
§ 371 (c)(1),
(2) Date: Feb. 5, 2024

(87) PCT Pub. No.: WO2023/020892
PCT Pub. Date: Feb. 23, 2023

(65) Prior Publication Data
US 2024/0281422 A1    Aug. 22, 2024

(30) Foreign Application Priority Data
Aug. 18, 2021 (EP) .................. 21191938

(51) Int. Cl.
*G06N 3/0455* (2023.01)
*G06F 16/215* (2019.01)

(52) U.S. Cl.
CPC ......... *G06N 3/0455* (2023.01); *G06F 16/215* (2019.01)

(58) Field of Classification Search
None
See application file for complete search history.

(56) References Cited

U.S. PATENT DOCUMENTS 10,394,770 B2    8/2019   Asher et al.
10,923,111 B1 *  2/2021   Fan .................. G10L 15/16
(Continued)

OTHER PUBLICATIONS

PCT International Search Report & Written Opinion for PCT/EP2022/072331, mailed on Oct. 4, 2022.
(Continued)

*Primary Examiner* — Khanh B Pham
*Assistant Examiner* — Navneet Gmahl
(74) *Attorney, Agent, or Firm* — Schmeiser, Olsen & Watts, LLP (57) ABSTRACT

An auto-encoder model processes a datasets describing a physical part from a part catalogue in the form of a property co-occurrence graph is provided, and performs entity resolution and auto-completion on the co-occurrence graph in order to compute a corrected and/or completed dataset. The encoder includes a recurrent neural network and a graph attention network. The decoder contains a linear decoder for numeric values and a recurrent neural network decoder for strings. The auto-encoder model provides an automated end-to-end solution that can auto-complete missing information as well as correct data errors such as misspellings or wrong values. The auto-encoder model is capable of auto-completion for highly unaligned part specification data with missing values.

12 Claims, 11 Drawing Sheets

(56) References Cited

U.S. PATENT DOCUMENTS

| | | | | |
|---|---|---|---|---|
| 2019/0354836 | A1* | 11/2019 | Shah | G06N 3/045 |
| 2020/0089650 | A1* | 3/2020 | Sharma | G06F 18/15 |
| 2020/0183773 | A1* | 6/2020 | Brehm | G06N 3/082 |
| 2020/0285944 | A1* | 9/2020 | Lee | G06F 18/24 |
| 2020/0388401 | A1* | 12/2020 | Spiro | G16H 20/10 |
| 2021/0117395 | A1 | 4/2021 | Wang et al. | |
| 2021/0287069 | A1* | 9/2021 | Mumcuyan | G06F 18/214 |
| 2021/0342701 | A1* | 11/2021 | Ayush | G06V 10/764 |

OTHER PUBLICATIONS

Jie Zhou et al: "Graph Neural Networks: A Review of Methods and Applications", arxiv.org, Cornell University Library, 201 Olin Library Cornell University Ithaca, NY 14853, Dec. 20, 2018.

Obraczka, D., Schuchart, J., and Rahm, E.:"Eager: Embedding-Assisted Entity Resolution for Knowledge Graphs", arXiv:2101.06126v1 [cs.LG], 2021.

Xu, D., Ruan, C., Korpeoglu, E., Kumar, S., and Achan, K.: "Product Knowledge Graph Embedding for E-commerce", WSDM '20: The Thirteenth ACM International Conference on Web Search and Data Mining, USA 2020, pp. 672-680, 2020 0.

Papadakis, G., Tsekouras, L., Thanos, E., Giannakopoulos, G., Palpanas, T., and Koubarakis, M.: "JedAI: The force behind entity resolution", The Semantic Web: ESWC 2017 Satellite Events, Revised Selected Papers, vol. 10577 of Lecture Notes in Computer Science, Springer, 2017, p. 161-166, 2017.

\* cited by examiner

| Product | Property | Unit of Measure | Value |
|---|---|---|---|
| Capacitor A | Form | - | Pixsize0.31x0.31 |
| Capacitor A | Gain | Amp V | 1000@5a@4v |
| Capacitor A | Thermal Voltage | Volt per Kelvin | 6.4mv/K |
| Capacitor A | Input Voltage | Volt | also operates at 88 to 350 VDC |

FIG 4

| Product | Property | Unit of Measure | Value |
|---|---|---|---|
| Capacitor B | Shape | - | 0.31x0.31 |
| Capacitor B | Current Gain | - | 1000@5a@4v |
| Capacitor B | Therm. V. Nom. | V/K | 0.0064 |
| Capacitor B | Operating Voltage | V | 88(Min)-350(Max) |

METHOD AND SYSTEM FOR AUTOMATED CORRECTION AND/OR COMPLETION OF A DATABASE

CROSS-REFERENCE TO RELATED APPLICATIONS

This application claims priority to PCT Application No. PCT/EP2022/072331, having a filing date of Aug. 9, 2022, which claims priority to EP application Ser. No. 21/191, 938.6, having a filing date of Aug. 18, 2021, the entire contents both of which are hereby incorporated by reference.

FIELD OF TECHNOLOGY

The following relates to a method and system for automated correction and/or completion of a database.

BACKGROUND

Product catalogues are an essential element of any component engineering process. In contrast to consumer product catalogues (e.g., amazon, etc.), industrial product/part catalogues must be highly accurate in terms of their technical data, especially product parameters (i.e., technical attributes). When looking for suitable parts, a component engineer must be certain that the given parameters match his specification, otherwise correct functioning of his solution cannot be guaranteed.

Insufficient data quality in industrial part catalogues is a widely acknowledged problem with significant impacts on procurement, manufacturing, and product quality. Especially in electrical engineering, millions of parts are on the market often with low quality specifications. Any application area that leverages search technologies on this data suffers from returning either incorrect results or missing relevant results entirely. Machine learning models that wish to make use of this data will also tend to perform poorly (e.g., similarity search, part recommender systems).

Finding data quality issues, such as wrong units of measure or inconsistent parameter values, in a semi-automated and data-driven way is a difficult task since it requires domain knowledge. Human engineers usually have a very good intuition on parameters and how they are related physically in their field of expertise and can spot issues quickly. However, getting human experts to label issues is time consuming and expensive.

Papadakis, G., Tsekouras, L., Thanos, E., Giannakopoulos, G., Palpanas, T., and Koubarakis, M., Jedai: The force behind entity resolution, The Semantic Web: ESWC 2017 Satellite Events, Revised Selected Papers, volume 10577 of Lecture Notes in Computer Science, Springer, 2017, pages 161-166, describes a traditional end-to-end system for entity resolution that involves several steps, such as data pre-processing, blocking, clustering and matching. In each of these steps a domain expert is expected to be involved and to guide the process. Additionally, knowledge and understanding of the data sources is required, which can be challenging. Moreover, the entity matching depends on regular expression text matching and fuzzy string matching, which in the case of missing values or noisy data would not yield a good result.

Obraczka, D., Schuchart, J., and Rahm, E., EAGER: embedding-assisted entity resolution for knowledge graphs, 2021, arXiv:2101.06126v1 [cs.LG], describes a more sophisticated tool that starts by representing the datasets as knowledge graphs (KGs) and then by using different graph embedding methods, generates representation of the data in high-dimensional space. The transformation from tabular to a KG format of industrial data is not a trivial task and it can involve domain specific modification, such as the one mentioned in Xu, D., Ruan, C., Korpeoglu, E., Kumar, S., and Achan, K., Product knowledge graph embedding for e-commerce, WSDM '20: The Thirteenth ACM International Conference on Web Search and Data Mining, 2020, pages 672-680.

Solutions which resort to graph embedding methods also require a set of seed alignments, i.e., a set of existing matches between the data in the input graphs. However, in the industrial setting, such seed alignments are very rarely available and the process of extracting such pairs is expensive, requiring expertise and human labor.

SUMMARY

It is an aspect of embodiments of the present invention to identify a problem in the conventional art and to find a technical solution for this.

According to the computer implemented method for automated correction and/or completion of a database, the following operations are performed by components, wherein the components are software components executed by one or more processors and/or hardware components:

providing, in a database, a set of datasets representing a set of physical parts, wherein each dataset represents one of the parts and identifies at least one property of the part as well as its value, receiving, by an auto-encoder model containing an encoder and a decoder, a co-occurrence graph representing a first dataset from the set of datasets, with the first dataset representing a first part, wherein the co-occurrence graph contains a set of nodes, including property nodes representing the properties of the first part and value nodes representing values of the properties of the first part, wherein the value nodes form a fully connected graph within the co-occurrence graph, and wherein each value node is connected to its corresponding property node, and optionally, to a unit node representing a unit of measure, performing, by the auto-encoder model, entity resolution and/or auto-completion on the co-occurrence graph in order to compute a corrected and/or completed first dataset, and storing the corrected and/or completed first dataset in the database.

The system for automated correction and/or completion of a database comprises:

a database storing a set of datasets representing a set of physical parts, wherein each dataset represents one of the parts and identifies at least one property of the part as well as its value, a processor configured for execution of an auto-encoder model containing an encoder and a decoder, configured for receiving a co-occurrence graph representing a first dataset from the set of datasets, with the first dataset representing a first part, wherein the co-occurrence graph contains a set of nodes, including property nodes representing the properties of the first part and value nodes representing values of the properties of the first part, wherein the value nodes form a fully connected graph within the co-occurrence graph, and wherein each value node is connected to its corresponding property node, and optionally, to a unit node representing a unit of measure, and performing, by the auto-encoder model, entity resolution and/or auto-completion on the co-occurrence graph in order to compute a corrected and/or completed first dataset.

The following advantages and explanations are not necessarily the result of the object of the independent claims. Rather, they may be advantages and explanations that only apply to certain embodiments or variants.

With regard to embodiments of the invention, the term "part" refers to any physical part, physical component, and/or physical material that can be used by an engineer to build any kind of physical product, for example a car or an industrial automation system. In other words, a part could be a transistor, a casing, a processor, a PLC, a motor, or a cable. These are, of course, completely arbitrary examples.

With regard to embodiments of the invention, the term "co-occurrence graph" refers to a graph representing a part, wherein the co-occurrence graph contains a set of nodes, including property nodes representing the properties of the part and value nodes representing values of the properties of the part. The value nodes form a fully connected graph within the co-occurrence graph. Each value node is connected to its corresponding property node, and optionally, to a unit node representing a unit of measure.

With regard to embodiments of the invention, the automated correction and/or completion of the database is achieved by automated or semi-automated correction and/or completion of a single dataset in the database, for example. Of course, the automated correction and/or completion of the database can also include automated or semi-automated correction and/or completion of several or all datasets stored in the database.

For example, each dataset contains technical part specification data as parametric data describing each part's given parameters. As a result, the set of datasets forms, for example, a part catalogue. The datasets can be implemented with any kind of data structure, for example tables, a co-occurrence graphs, or elements of a relational database.

In connection with embodiments of the invention, unless otherwise stated in the description, the terms "training", "generating", "computer-aided", "calculating", "determining", "reasoning", "retraining" and the like relate to actions and/or processes and/or processing steps that change and/or generate data and/or convert the data into other data, the data in particular being or being able to be represented as physical quantities, for example as electrical impulses.

The term "computer" should be interpreted as broadly as possible, in particular to cover all electronic devices with data processing properties. Computers can thus, for example, be personal computers, servers, clients, programmable logic controllers (PLCs), handheld computer systems, pocket PC devices, mobile radio devices, smartphones, devices or any other communication devices that can process data with computer support, processors and other electronic devices for data processing. Computers can in particular comprise one or more processors and memory units.

In connection with embodiments of the invention, a "memory", "memory unit" or "memory module" and the like can mean, for example, a volatile memory in the form of random-access memory (RAM) or a permanent memory such as a hard disk or a Disk.

In embodiments, the method and system, or at least some of their embodiments, provide an automated end-to-end solution that can auto-complete missing information as well as correct data errors such as misspellings or wrong values.

In embodiments, the method and system, or at least some of their embodiments, provide with the auto-encoder model a joint model that jointly solves entity resolution as well as missing data imputation on any material property. As a result, the auto-encoder model is capable of auto-completion for highly unaligned part specification data with missing values. This has multiple benefits:

First, the auto-encoder model can be trained completely unsupervised (self-supervised) as no labeled training data is required. Second, the auto-encoder model can capture correlation between any part specification property, value, and unit of measure. Third, the auto-encoder model is a single model instead of many models (for example, one for each property and unit) as would be the case in a Euclidean (table-based) missing data imputation algorithm. Fourth, the auto-encoder model can natively handle misspelled property and values terms and learn to align them.

A further advantage is the ability for interactive user involvement. As the auto-encoder model operates purely on character-level, immediate feedback to the user can be given, for example after each character that the user is typing or editing.

In an embodiment of the method and system, the first dataset has at least one missing value that is filled in the corrected and/or completed first dataset. The missing value is represented as an auxiliary node in the co-occurrence graph. The decoder decodes the missing value for the auxiliary node. The missing value is filled into the corrected and/or completed first dataset.

In an embodiment of the method and system, wherein the first dataset contains at least one data error, in particular a misspelling or a wrong numeric value, that is corrected in the corrected and/or completed first dataset. The decoder decodes values for every node in the co-occurrence graph. All decoded values are compared to their original values in the first dataset. If one of the decoded values differs from its original value, or if a difference between one of the decoded values and its original value exceeds a threshold, the respective decoded value replaces the respective original value in the corrected and/or completed first dataset.

In an embodiment of the method and system, the first dataset contains an incomplete string or an incomplete number that is completed with output of the decoder in the corrected and/or completed first dataset.

In an embodiment of the method and system, the encoder consists of a recurrent neural network and a graph attention network.

In an embodiment of the method and system, the encoder processes the set of nodes in in the co-occurrence graph according to the formula $$\text{Encoder}(X, G) = GAT(RNN(X), G),$$

In an embodiment of the method and system, the graph attention network stores an attention weight for every link in the co-occurrence graph according to the formula $$\alpha_{ij} = a[W_{att}RNN(x_i), W_{att}RNN(x_j)],$$

wherein where a and $W_{att}$ are trainable parameters.

In an embodiment of the method and system, the decoder contains a linear decoder for numeric values and a recurrent neural network decoder for strings.

An embodiment of the method comprises the additional step of outputting, by a user interface, the corrected and/or completed first dataset, and detecting, by the user interface, a confirming user interaction, before storing the corrected and/or completed first dataset in the database.

An embodiment of the method comprises the additional step of receiving, by the user interface, one or more characters or digits and storing them as an incomplete string or incomplete number in the first dataset. The incomplete string or incomplete number is completed in the corrected and/or completed first dataset.

This embodiment allows the auto-encoder model to auto-complete character-level input of a user, in particular after typing first letters or numbers in a property name field, a unit of measure field, or a value field on a user interface.

In an embodiment of the method and system, the database is a graph database containing as datasets a co-occurrence graph for each part, with each co-occurrence graph containing a set of nodes, including property nodes representing the properties of the respective part and value nodes representing values of the properties for the respective part,
  wherein the value nodes form a fully connected graph within the respective co-occurrence graph, and
  wherein each value node is connected to its corresponding property node, and optionally, to a unit node representing a unit of measure.

A computer program product (non-transitory computer readable storage medium having instructions, which when executed by a processor, perform actions) has program instructions for carrying out the method.

The provision device for the computer program product stores and/or provides the computer program product.

BRIEF DESCRIPTION

Some of the embodiments will be described in detail, with references to the following figures, wherein like designations denote like members, wherein.

DETAILED DESCRIPTION

In the following description, various aspects of embodiments of the present invention and embodiments thereof will be described. However, it will be understood by those skilled in the art that embodiments may be practiced with only some or all aspects thereof. For purposes of explanation, specific numbers and configurations are set forth in order to provide a thorough understanding. However, it will also be apparent to those skilled in the art that the embodiments may be practiced without these specific details.

The described components can each be hardware components or software components. For example, a software component can be a software module such as a software library: an individual procedure, subroutine, or function: or, depending on the programming paradigm, any other portion of software code that implements the function of the software component. A combination of hardware components and software components can occur, in particular, if some of the effects according to embodiments of the invention are exclusively implemented by special hardware (e.g., a processor in the form of an ASIC or FPGA) and some other part by software.

Figure 1:
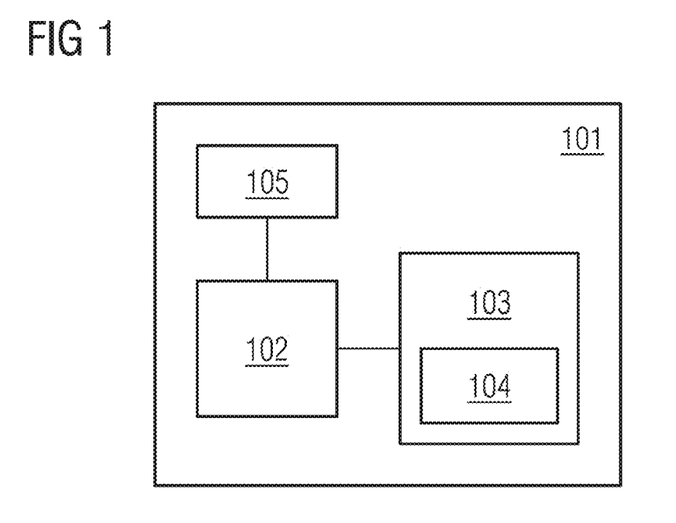
FIG. 1 shows a first embodiment.

FIG. 1 shows one sample structure for computer-implementation of embodiments of the invention which comprises:
  (101) computer system
  (102) processor
  (103) memory
  (104) computer program (product)
  (105) user interface In this embodiment of the invention the computer program product 104 comprises program instructions for carrying out embodiments of the invention. The computer program 104 is stored in the memory 103 which renders, among others, the memory and/or its related computer system 101 a provisioning device for the computer program product 104. The system 101 may carry out embodiments of the invention by executing the program instructions of the computer program 104 by the processor 102. Results of embodiments of invention may be presented on the user interface 105. Alternatively, they may be stored in the memory 103 or on another suitable means for storing data.

Figure 2:
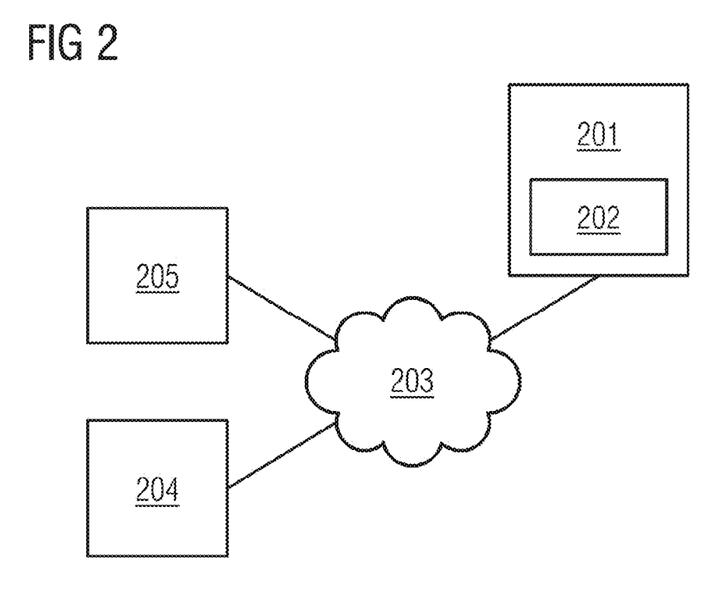
FIG. 2 shows another embodiment.

FIG. 2 shows another sample structure for computer-implementation of embodiments of the invention which comprises:
  (201) provisioning device
  (202) computer program (product)
  (203) computer network/Internet
  (204) computer system
  (205) mobile device/smartphone In this embodiment the provisioning device 201 stores a computer program 202 which comprises program instructions for carrying out embodiments of the invention. The provisioning device 201 provides the computer program 202 via a computer network/Internet 203. By way of example, a computer system 204 or a mobile device/smartphone 205 may load the computer program 202 and carry out embodiments of the invention by executing the program instructions of the computer program 202.

The embodiments shown in FIGS. 6-13 can be implemented with a structure as shown in FIG. 1 or FIG. 2.

Figure 3:
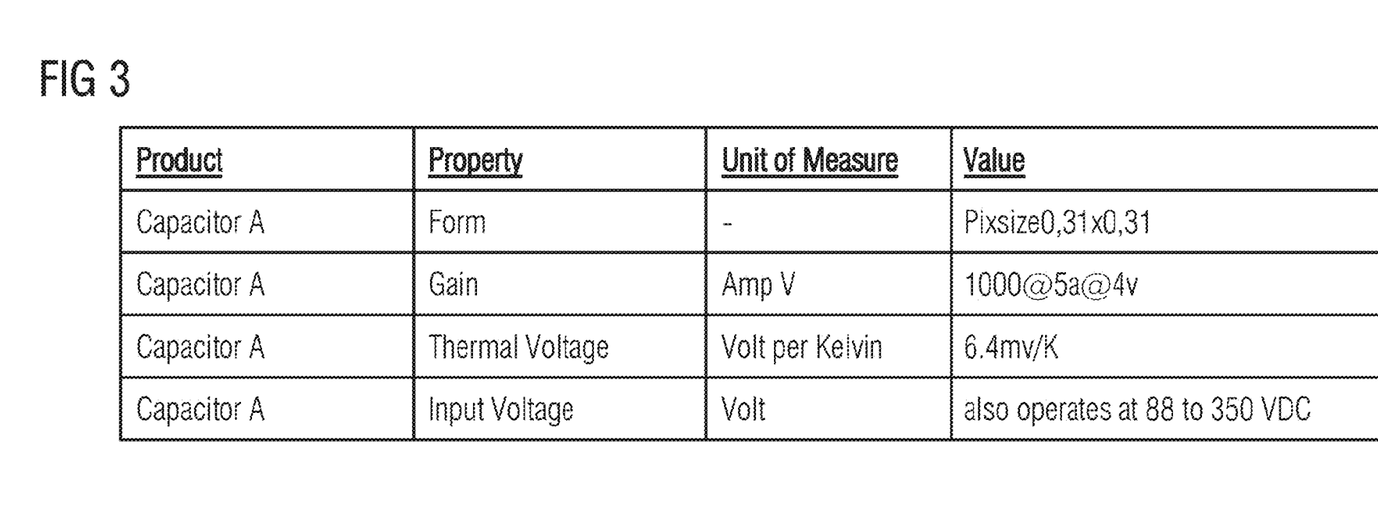
FIG. 3 shows a first example from an electronics product catalogue.
Figure 4:
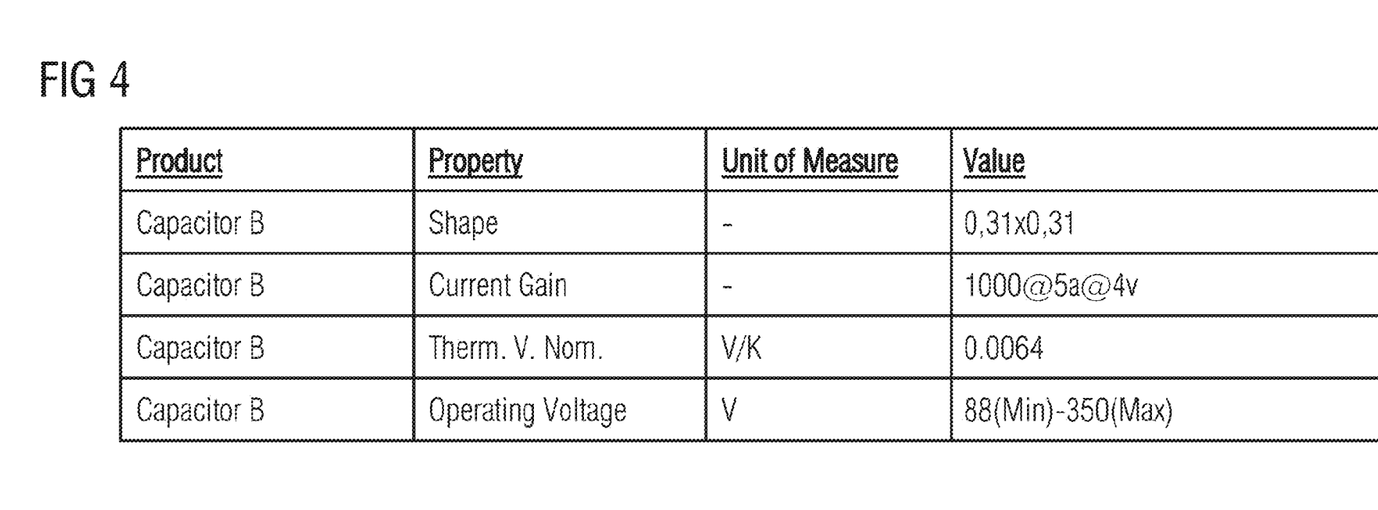
FIG. 4 shows a second example from an electronics product catalogue.

FIG. 3 shows an example from an electronics product catalogue, here a specification for a capacitor A, while FIG.

4 shows a specification for capacitor B. As typical, properties of the capacitors are described in free text, the unit of measure is optional, and the value can also be free text.

The task for the embodiments described with regard to FIGS. 6-13 is to detect that the properties "shape" and "form" have the same semantics (i.e., both correspond to the same physical property). Further, the embodiments need to know that "V/K" is the same as "Volt per Kelvin" and that "6.4 mv/K" is in this case the same as "0.0064 V/K". Additionally, the text expression "also operates at 88 to 350 VDC" is the same as "88(Min)-350(Max)".

As for auto-completion, at least some of the embodiments described with regard to FIGS. 6-13 can infer that the missing unit of measure for "Current Gain" for Capacitor B is probably "Amp V".

A technical challenge of at least some of the embodiments described with regard to FIGS. 6-13 is to encode these misaligned and domain-specific vocabularies of materials in a semantic space that reflects aligned semantics across different terms.

State-of-the-art NLP techniques (e.g., general-purpose pre-trained word embeddings such as BERT or word2vec) fail to deal with such domain-specific terminology. On the other hand, there is a lot of hidden correlation to be captured in material specifications, since all materials operate in the physical world and therefore share physical properties that are highly correlated.

Figure 5:
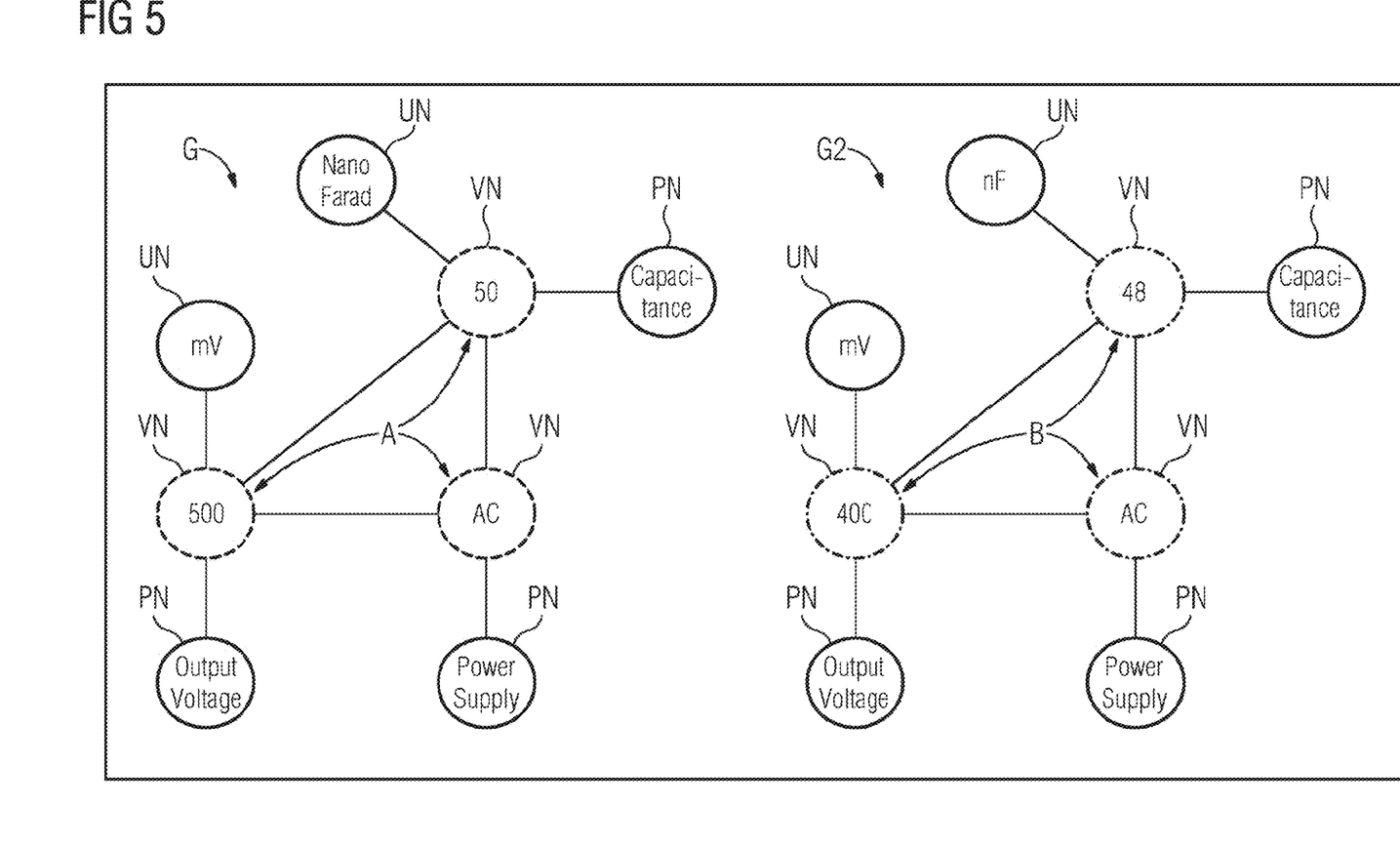
FIG. 5 shows a co-occurrence graph G for a first part A and a second co-occurrence graph G2 for a second part B.
Figure 6:
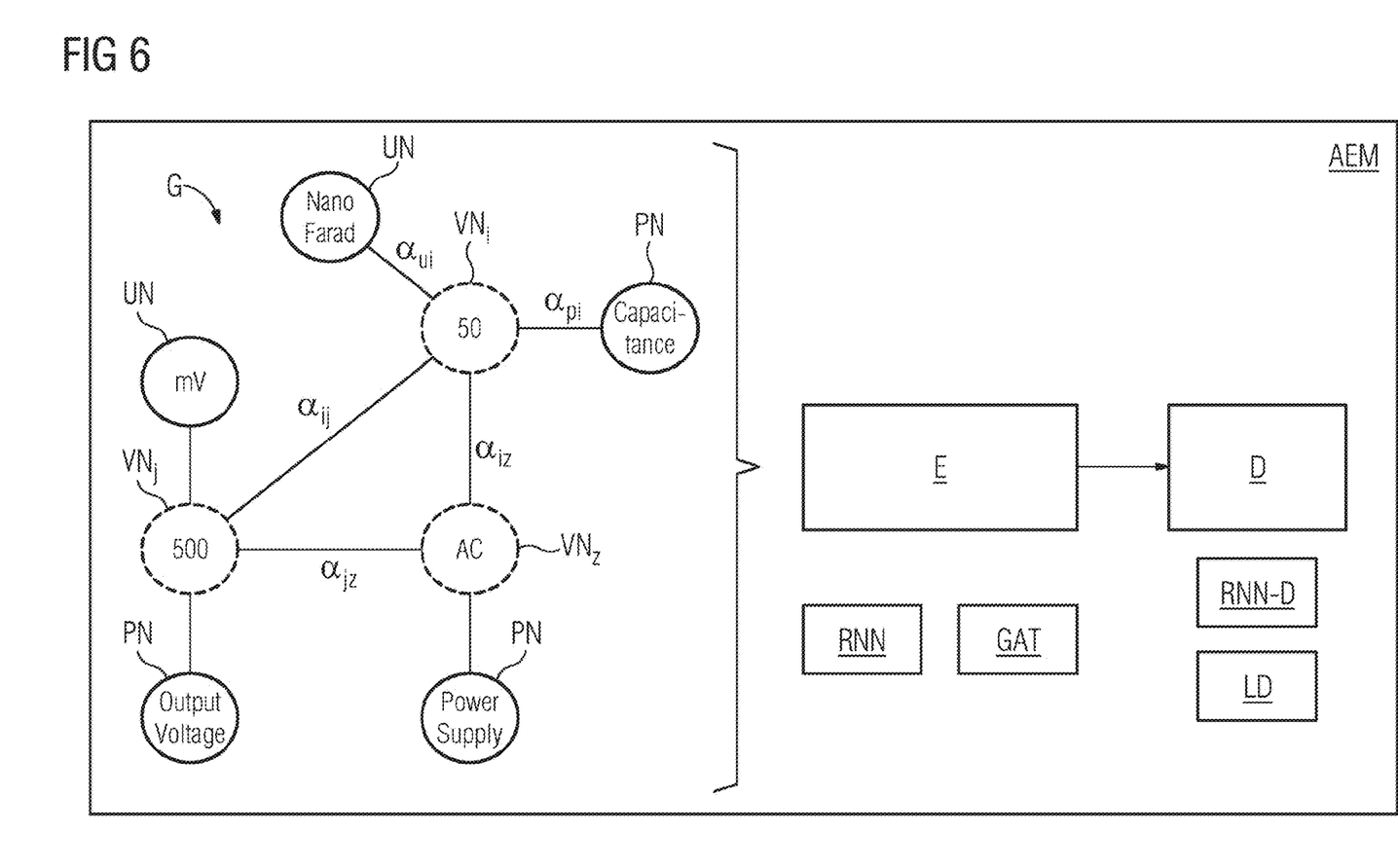
FIG. 6 shows an auto-encoder model AEM.
Figure 7:
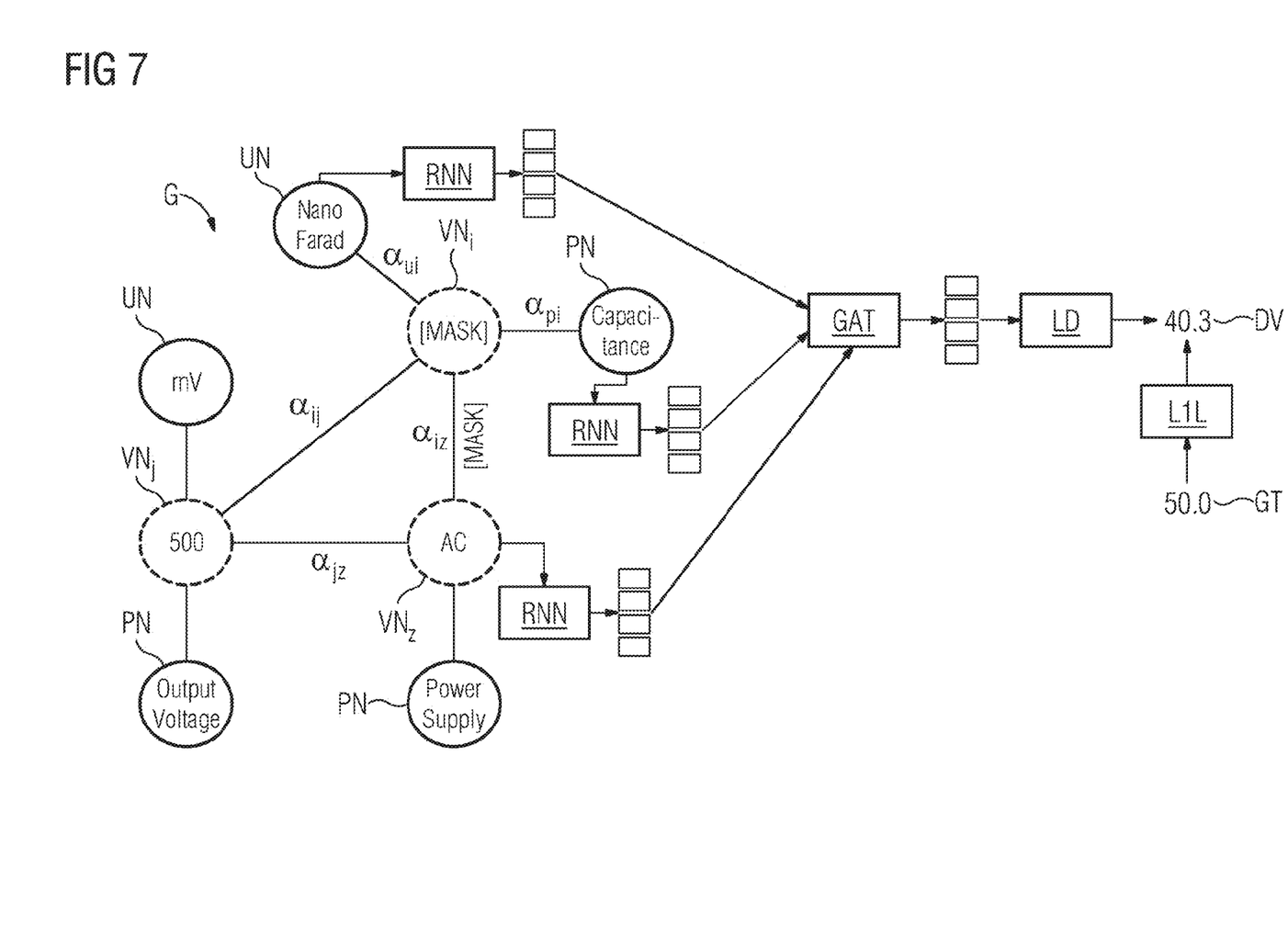
FIG. 7 shows a training procedure for the auto-encoder model AEM when masking a numeric value.
Figure 8:
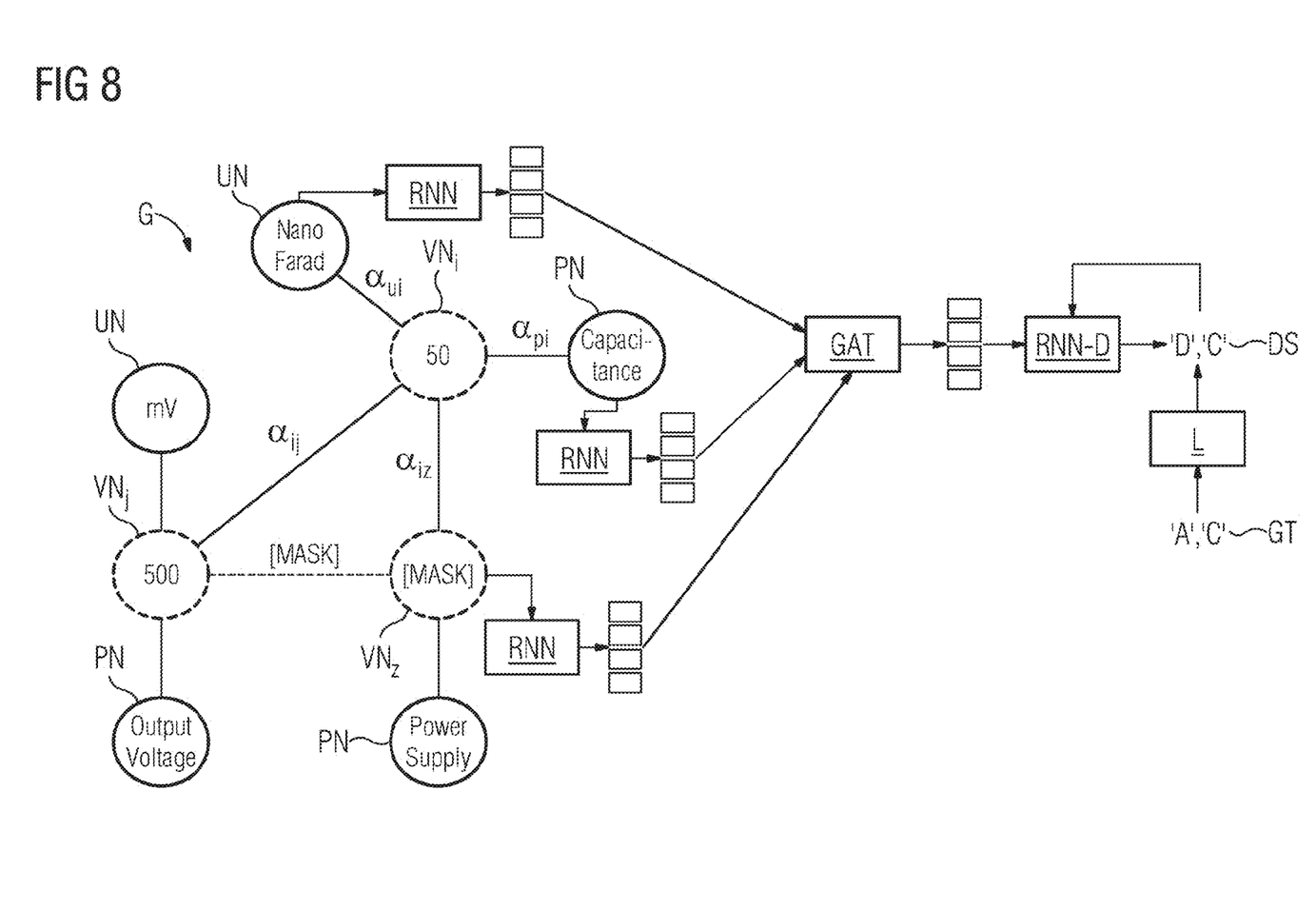
FIG. 8 shows a training procedure for the auto-encoder model AEM when masking a string value.

At least some of the embodiments described with regard to FIGS. 6-13 aim at assisting engineers to search through non-aligned material specifications and provide a "cleansed" view on missing or erroneous information. In order to reach this goal, at least some of the embodiments use a co-occurrence graph as shown in FIG. 5, an auto-encoder model AEM as shown in FIG. 6, and a suitable training procedure for training the auto-encoder model AEM as shown in FIGS. 7 and 8.

In this sense at least some of the embodiments provide one model that jointly solves entity resolution as well as missing data imputation on any material property.

As a first step, for each part of a set of parts (with the set containing, for example, all parts) a co-occurrence graph G is built (one graph per part, focusing on the co-occurrence of properties between parts), with the co-occurrence graph G representing properties of the respective part, and wherein the property values of each part form a fully connected graph within the co-occurrence graph G. Each value is connected to its property and optional unit of measure.

Building a co-occurrence graph (G) for each part in this way is a simple procedure that can be implemented by a computer program that processes, for example, tables in a database that store the respective information about the parts.

FIG. 5 shows a co-occurrence graph G for a first part A and a second co-occurrence graph G2 for a second part B. Property nodes PN represent properties of the respective part and value nodes VN represent values of these properties for the respective part. As shown in FIG. 5, the value nodes VN are specific either to the first part A or to the second part B, whereas both co-occurrence graphs have the same property nodes PN. The value nodes VN form a fully connected graph within the respective co-occurrence graph. Each value node VN is connected to its corresponding property node PN, and optionally, to a unit node UN representing a unit of measure.

To simplify the encoding process, all node features are just the character sequences of their values/names. Even in case of numerical values, a character sequence is formed, e.g., 50 turns into the character sequences "5", "0".

FIG. 6 shows a high-level encoder-decoder model, which is an auto-encoder model AEM that contains an encoder E and a decoder D. Technically, the encoder E consists of a recurrent neural network RNN and a graph attention network GAT.

Given a set of nodes X (containing the value nodes VN, the property nodes PN, and the unit nodes UN) in a graph G (for example the co-occurrence graph G representing the first part A) as input:

$$\text{Encoder}(X, G) = GAT(RNN(X), G),$$

The internal attention mechanism of the graph attention network GAT learns which other values are of high importance when trying to predict the value of another node. For every link in graph G the attention weight $\alpha_{ij}$ for that link is given by:

$$\alpha_{ij} = a[W_{att}RNN(x_i), W_{att}RNN(x_j)]$$

where a and $W_{att}$ are trainable parameters.

The training procedure takes a given set of part specifications (from non-aligned data sources) as input. The auto-encoder model AEM is then trained by iteratively sampling masks (i.e., temporary deletion of certain nodes) and the objective is to reconstruct the masked values as close as possible. Any node type can be masked: value nodes VN, unit nodes UN, or property nodes PN.

To further simulate missing values during training a certain percentage of links are masked and hidden from the model.

While the encoder does not distinguish between strings and numeric values, the decoders do. Two types of decoders can be used, one for numeric values and one for strings.

FIG. 7 shows the training procedure when masking a numeric value of a first value node $VN_i$ and a link between the first value node $VN_i$ and a third value node $VN_z$. A linear decoder LD decodes the numeric value for the masked first value node $VN_i$. The decoded value DV (40.3) is then compared to its ground-truth GT (50.0) in order to compute a L1-Loss LIL.

FIG. 8 shows the training procedure when masking a string value of the third value node $VN_z$ and a link between the third value node $VN_z$ and a second value node $VN_j$. Here, a recurrent neural network decoder RNN-D decodes the letters 'D' and 'C' as a decoded string DS, which is then compared to its ground-truth GT (a string formed by the letters 'A' and 'C') in order to compute a loss L.

The loss objective for a masked node x in graph G can be formulated as follows:

$$\hat{x} = \text{Decoder}(\text{Encoder}(x, G))$$
$$L(\hat{x}) = \alpha_1 l_{num}(\hat{x}_{num}) + \alpha_2 l_{str}(\hat{x}_{str})$$

Where $\hat{x}$ is either a decoded numeric value $\hat{x}_{num}$ or a character sequence $\hat{x}_{str}$. And $l_{num}$ is the root-mean squared error (or any other regression loss, for example smooth L1).

Similar, $l_{str}$ is a character-wise binary cross-entropy loss. The decoder here also needs to learn a special character [EOS] which represents its "end of sequence".

As the two losses possible lie on different scales, $\alpha_1$ and $\alpha_2$ are two hyperparameters that can ensure stable training.

Figure 9:
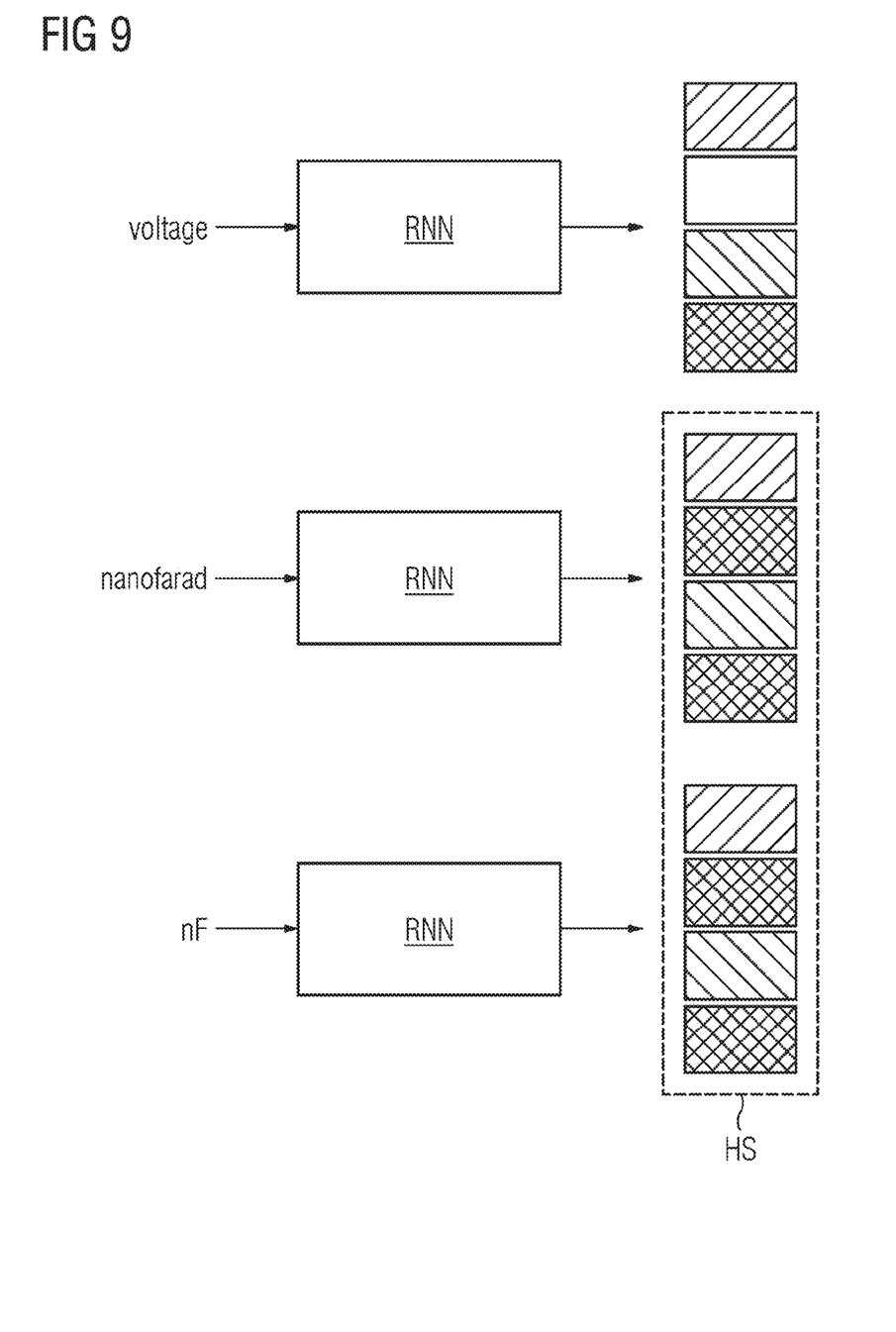
FIG. 9 shows term-based entity resolution by the auto-encoder model AEM.
Figure 10:
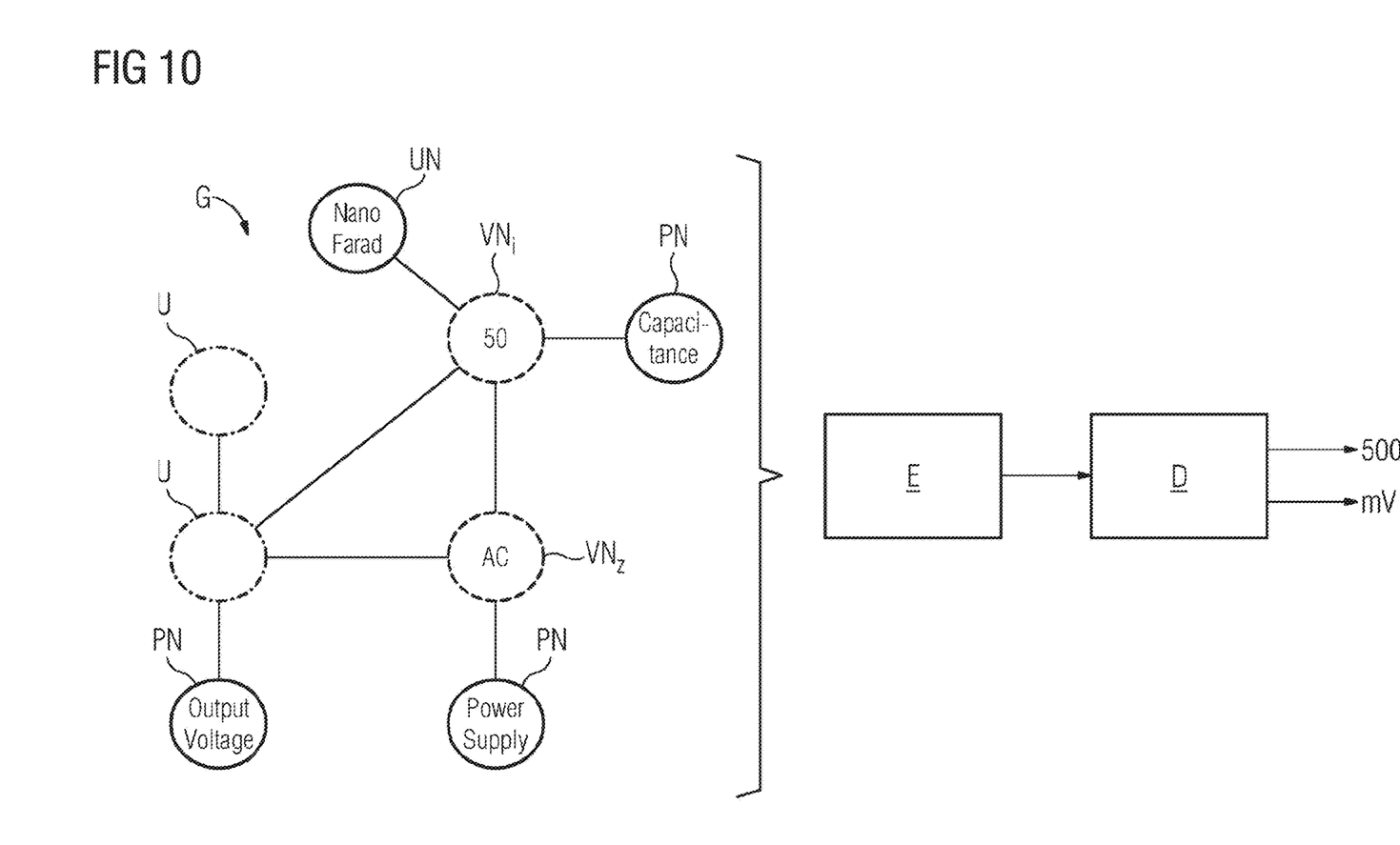
FIG. 10 shows auto-completion by the auto-encoder model AEM.

After training, the auto-encoder model AEM is capable of two kinds of inference steps: in a first step, term-based entity resolution as shown in FIG. 9, and in a second step, auto-completion as shown in FIG. 10.

Term-based entity resolution discovers how different terms are related to each other. FIG. 9 shows that by simply feeding different terms, character-by-character into the recurrent neural network RNN (which is part of the encoder E shown in FIG. 6) it can be automatically detected which terms are semantically similar to each other, due to their high similarity HS exceeding a threshold.

FIG. 10 shows the second inference step, which is auto-completion. Here, the auto-encoder model AEM shown in FIG. 6 acts as a generative model that can fill in any gaps in a given co-occurrence graph G, here two unknown nodes U. In order to trigger auto-completion, the input is prepared accordingly to include any nodes that should be auto-completed, as will be described in more detail in the next paragraph.

To infer missing values, the unknown nodes U (e.g., a missing unit node as shown in FIG. 10) are attached to the co-occurrence graph G as auxiliary nodes, with the unknown node U for the unit node for example containing the empty string. The co-occurrence graph G is then fed to the auto-encoder model AEM. The decoder D will give the most likely value for the unit node in place of the empty string, here the string "mV". Similarly, the decoder D decodes the missing numeric value 500 for the other unknown node U as shown in FIG. 10.

As an alternative or in addition to the example shown in FIG. 10, the auto-encoder model AEM can also infer data errors: For every node in the co-occurrence graph G the original (potentially erroneous) input is fed to the auto-encoder model AEM and the decoded output is compared to its original value. In case of deviations (or if a user-defined threshold is met), the decoded value can directly replace the original value.

As an alternative or in addition to the examples described above, the auto-encoder model AEM can also infer incomplete values. The procedure is the same as in the previous paragraph with the additional constraint that the decoder output is only starting after the incomplete original value.

By automatically translating datasets, for example tables, stored in a database into co-occurrence graphs and processing them with the auto-encoder model AEM, some or all of the datasets stored in the database can be corrected and/or auto-completed in a fully automated fashion.

All of the above operations, including operations that are not performed by the auto-encoder model itself, for example generating the co-occurrence graph G from a dataset in the database, comparing decoded values to original values and correcting and/or completing the dataset, are easily implemented in software that is executable by one or more processors and provides a fully automated solution for correcting and/or completing the database.

However, it is also possible to involve a user in the process of correcting and/or completing the database with a semi-automated approach, as will be described in the following.

Figure 11:
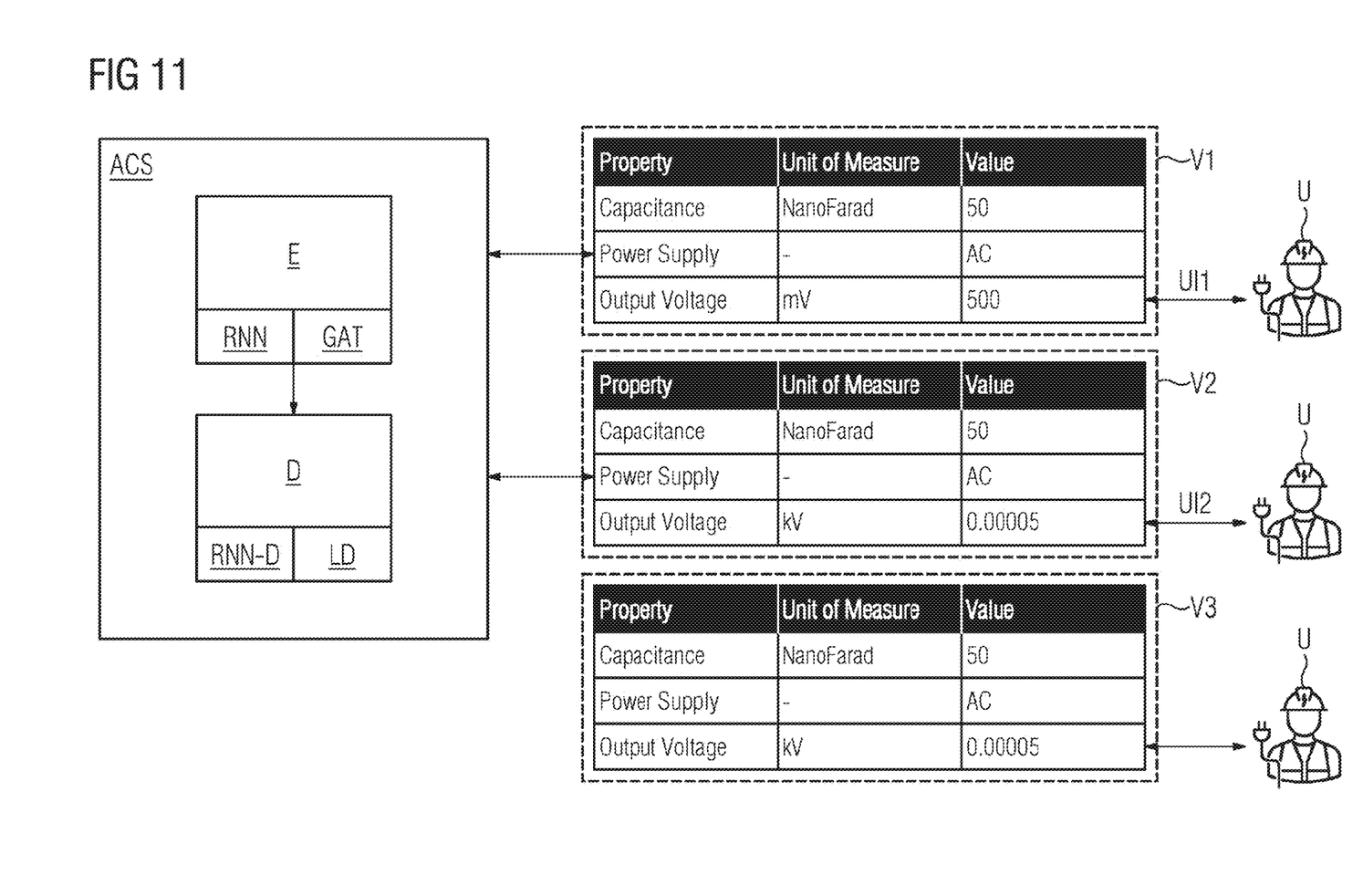
FIG. 11 shows a first example of a user U interacting with the auto-encoder model AEM acting as an auto-completion system ACS.

FIG. 11 shows user-interaction between the auto-encoder model AEM acting as an auto-completion system ACS, and a user U. Since the auto-completion system ACS operates on character-level input, the user U can interact with it by typing, e.g., giving the first letter of the property name.

In the example shown in FIG. 11, a first view V1 on a user interface contains auto-complete suggestions that the auto-completion system ACS has generated. In a first user interaction UI1, the user U enters the letter "k". The user interface then outputs a second view V2 with adjusted suggestions. In a second user interaction UI2, the user U accepts the auto-complete suggestions, which leads to the user interface outputting a third view V3 with the accepted values.

Figure 12:
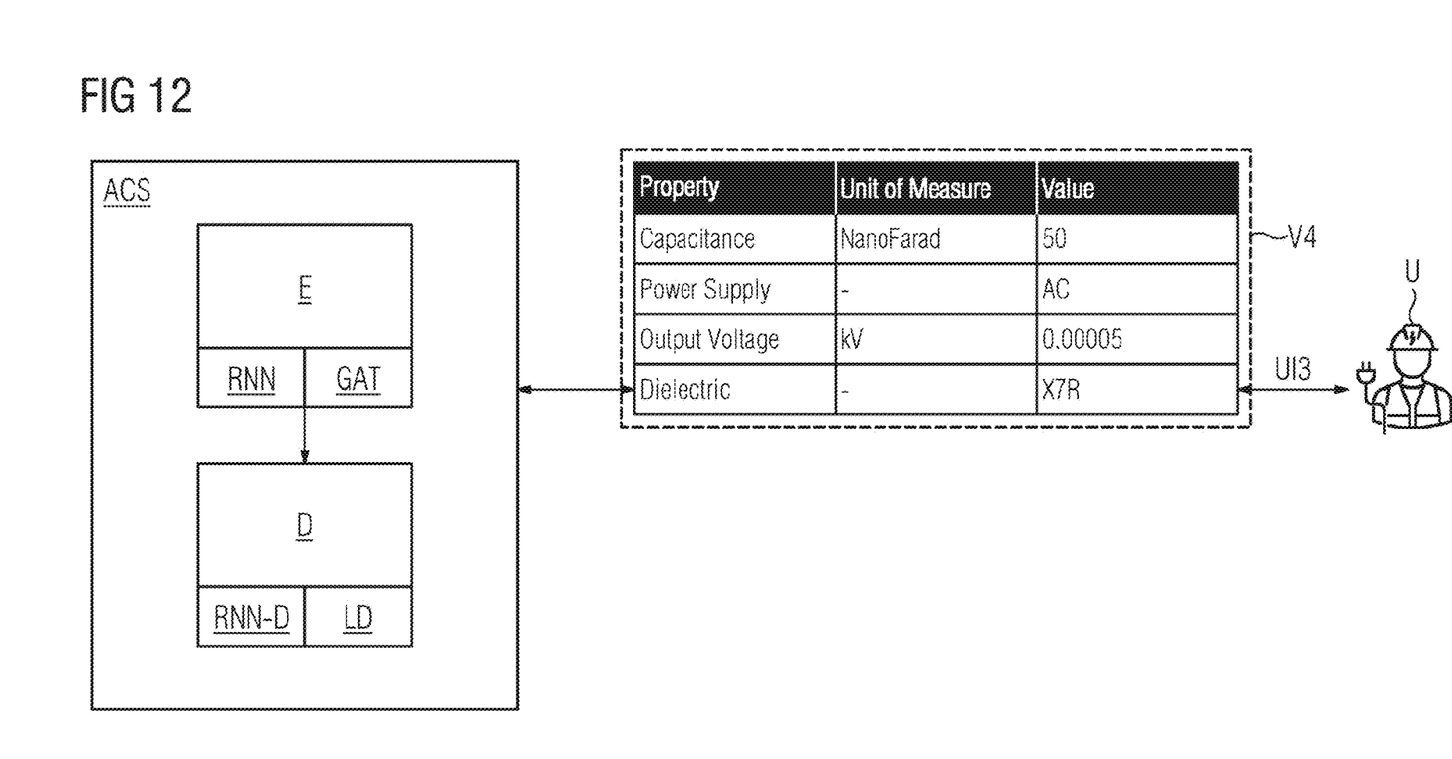
FIG. 12 shows a second example of a user U interacting with the auto-encoder model AEM acting as an auto-completion system ACS.

Similarly, when the user U wants to enter a new property for a given part, the auto-completion system ACS helps to auto-complete, as shown in FIG. 12. Here, in a third user interaction UI3 the user U has typed "Diel" to name a newly created property and gets auto-complete suggestions that are output by the user interface in a fourth view V4.

Figure 13:
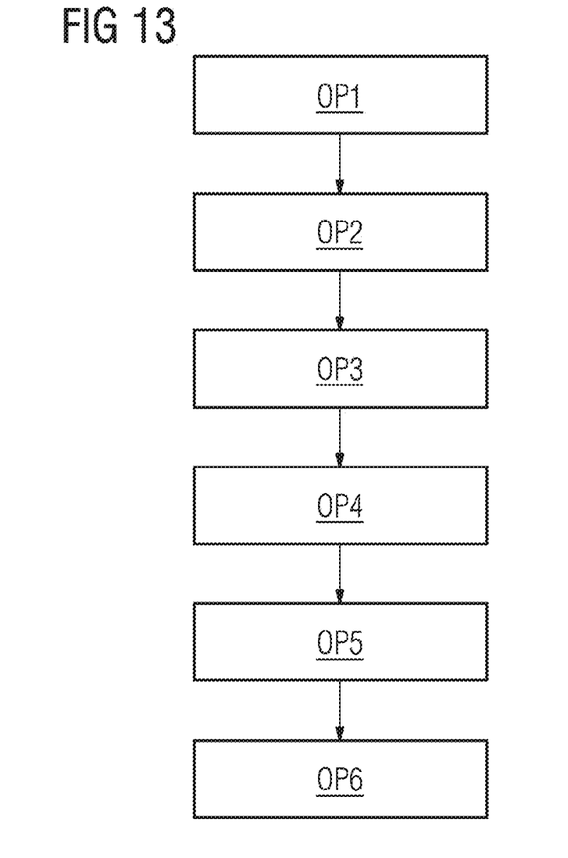
FIG. 13 shows a flowchart of a possible exemplary embodiment of a method.

FIG. 13 shows a flowchart of a possible exemplary embodiment of a method for automated correction and/or completion of a database.

According to the embodiment, the following operations are performed by components, wherein the components are software components executed by one or more processors and/or hardware components.

In a first operation OP1, a database provides a set of datasets representing a set of physical parts, wherein each dataset represents one of the parts and identifies at least one property of the part as well as its value.

In a second operation OP2, which is optional, a user interface receives one or more characters or digits. These are stored as an incomplete string or as an incomplete number in a first dataset. The first dataset is identical with the first dataset that will be described with regard to the next operation.

In a third operation OP3, an auto-encoder model containing an encoder and a decoder receives a co-occurrence graph representing a first dataset from the set of datasets, with the first dataset representing a first part, wherein the co-occurrence graph contains a set of nodes, including property nodes representing the properties of the first part and value nodes representing values of the properties of the first part, wherein the value nodes form a fully connected graph within the co-occurrence graph, and wherein each value node is connected to its corresponding property node, and optionally, to a unit node representing a unit of measure.

In a fourth operation OP4, the auto-encoder model performs entity resolution and/or auto-completion on the co-occurrence graph in order to compute a corrected and/or completed first dataset.

In a fifth operation OP5, which is optional, the user interface outputs the corrected and/or completed first dataset and detects a confirming user interaction.

In a sixth operation OP6, the corrected and/or completed first dataset is stored in the database.

For example, the method can be executed by one or more processors. Examples of processors include a microcontroller or a microprocessor, an Application Specific Integrated Circuit (ASIC), or a neuromorphic microchip, in particular a neuromorphic processor unit. The processor can be part of any kind of computer, including mobile computing devices such as tablet computers, smartphones or laptops, or part of a server in a control room or cloud.

The above-described method may be implemented via a computer program product including one or more computer-readable storage media having stored thereon instructions executable by one or more processors of a computing system. Execution of the instructions causes the computing system to perform operations corresponding with the acts of the method described above.

The instructions for implementing processes or methods described herein may be provided on non-transitory computer-readable storage media or memories, such as a cache, buffer, RAM, FLASH, removable media, hard drive, or other computer readable storage media. Computer readable storage media include various types of volatile and nonvolatile storage media. The functions, acts, or tasks illustrated in the figures or described herein may be executed in response to one or more sets of instructions stored in or on computer readable storage media. The functions, acts or tasks may be independent of the particular type of instruction set, storage media, processor or processing strategy and may be performed by software, hardware, integrated circuits, firmware, micro code and the like, operating alone or in combination. Likewise, processing strategies may include multiprocessing, multitasking, parallel processing and the like.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer implemented method for automated correction and/or completion of a database, comprising the following operations, wherein the operations are performed by components, and wherein the components are software components executed by one or more processors and/or hardware components:

providing, in a database, a set of datasets representing a set of physical parts, wherein each dataset represents one of the parts and identifies at least one property of the part as well as a value of the at least one property of the part, receiving, by an auto-encoder model containing an encoder and a decoder, a co-occurrence graph representing a first dataset from the set of datasets, with the first dataset representing a first part, wherein the co-occurrence graph contains a set of nodes, including property nodes representing the properties of the first part and value nodes representing values of the properties of the first part, wherein the value nodes form a fully connected graph within the co-occurrence graph, and wherein each value node is connected either to a property node corresponding to said each value node or to both said corresponding property node and a unit node representing a unit of measure, performing, by the auto-encoder model, entity resolution and/or auto-completion on the co-occurrence graph in order to compute a corrected and/or completed first dataset, and storing the corrected and/or completed first dataset in the database, wherein the encoder consists of a recurrent neural network and a graph attention network, and wherein the encoder processes the set of nodes in the co-occurrence graph according to a formula of:

$$\text{Encoder}(X, G) = GAT(RNN(X), G),$$

wherein X denotes a set of nodes, G denotes a co-occurrence graph, RNN denotes a recurrent neural network, and GAT denotes a graph attention network.

2. The method according to claim 1,
wherein the first dataset has at least one missing value that is filled in the corrected and/or completed first dataset,
wherein the missing value is represented as an auxiliary node in the co-occurrence graph,
wherein the decoder decodes the missing value for the auxiliary node, and wherein the missing value is filled into the corrected and/or completed first dataset.

3. The method according to claim 1,
wherein the first dataset contains at least one data error, a misspelling or a wrong numeric value, that is corrected in the corrected and/or completed first dataset,
wherein the decoder decodes values for every node in the co-occurrence graph,
wherein all decoded values are compared to their original values in the first dataset, and
wherein if one of the decoded values differs from an original value of said one of the decoded values, or if a difference between said one of the decoded values and said original value exceeds a threshold, the respective decoded value replaces the respective original value in the corrected and/or completed first dataset.

4. The method according to claim 1,
wherein the first dataset contains an incomplete string or an incomplete number that is completed with output of the decoder in the corrected and/or completed first dataset.

5. The method according to claim 1,
wherein the graph attention network stores an attention weight (dij) for every link in the co-occurrence graph according to the formula $$a_{ij} = a[W_{att}RNN(x_i), W_{att}RNN(x_j)],$$

wherein where a and $W_{att}$ are trainable parameters.

6. The method according to claim 1,
wherein the decoder contains a linear decoder for numeric values and a recurrent neural network decoder for strings.

7. The method according to claim 1, with the additional step of
outputting, by a user interface, the corrected and/or completed first dataset, and
detecting, by the user interface, a confirming user interaction, before storing the corrected and/or completed first dataset in the database.

8. The method according to claim 1, with the additional step of
receiving, by the user interface, one or more characters or digits and storing them as an incomplete string or incomplete number in the first dataset,
wherein the incomplete string or incomplete number is completed in the corrected and/or completed first dataset.

9. The method according to claim 1,
wherein the database is a graph database containing as datasets a co-occurrence graph for each part, with each co-occurrence graph containing a plurality of nodes, including a plurality of property nodes representing the properties of the respective part and a plurality of value nodes representing values of the properties for the respective part, wherein the plurality of value nodes form a fully connected graph within the respective co-occurrence graph, and wherein each value node of the plurality of value nodes is connected either to a property node which corresponds to said each value node of the plurality of value nodes or to both said property node which corresponds to said each value node and one unit node representing the unit of measure.

10. A computer program product, comprising a computer readable hardware storage device having computer readable program code stored therein, said program code executable by a processor of a computer system to implement a method with program instructions for carrying out a method according to claim 1.

11. A provision device for the computer program product according to claim 10, wherein the provision device stores and/or provides the computer program product.

12. A system for automated correction and/or completion of a database, comprising:
- a database storing a set of datasets representing a set of physical parts, wherein each dataset represents one of the parts and identifies at least one property of the part as well as a value of the at least one property of the part,
- a processor configured for execution of an auto-encoder model containing an encoder and a decoder, configured for receiving a co-occurrence graph representing a first dataset from the set of datasets, with the first dataset representing a first part, where in the co-occurrence graph contains a set of nodes, including property nodes representing the properties of the first part and value nodes representing values of the properties of the first part, wherein the value nodes form a fully connected graph within the co-occurrence graph, and wherein each value node is connected either to a property node corresponding to said each value node or to both said corresponding property node and a unit node representing a unit of measure, and performing, by the auto-encoder model, entity resolution and/or auto-completion on the co-occurrence graph in order to compute a corrected and/or completed first dataset, storing the corrected and/or completed first dataset in the database, wherein the encoder consists of a recurrent neural network and a graph attention network, and wherein the encoder processes the set of nodes in the co-occurrence graph according to a formula of:

$$\text{Encoder}(X, G) = GAT(RNN(X), G),$$

wherein X denotes a set of nodes, G denotes a co-occurrence graph, RNN denotes a recurrent neural network, and GAT denotes a graph attention network.

* * * * *